(12) United States Patent
Gobriel et al.

(10) Patent No.: US 8,599,729 B2
(45) Date of Patent: Dec. 3, 2013

(54) ADAPTIVE POWER CONTROL IN A WIRELESS DEVICE

(75) Inventors: Sameh Gobriel, Hillsboro, OR (US); Jr-Shian (James) Tsai, Beaverton, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 12/564,178

(22) Filed: Sep. 22, 2009

(65) Prior Publication Data

US 2011/0069649 A1 Mar. 24, 2011

(51) Int. Cl.
*G08C 17/00* (2006.01)
*H04B 1/16* (2006.01)

(52) U.S. Cl.
USPC ............... 370/311; 455/343.1; 455/343.2

(58) Field of Classification Search
USPC ....................................................... 370/311
See application file for complete search history.

(56) References Cited

U.S. PATENT DOCUMENTS

| | | | | |
|---|---|---|---|---|
| 7,295,827 | B2 * | 11/2007 | Liu et al. | 370/311 |
| 7,921,460 | B1 * | 4/2011 | Callon et al. | 726/22 |
| 2001/0015963 | A1 * | 8/2001 | Tuomainen et al. | 370/311 |
| 2004/0235536 | A1 * | 11/2004 | Kim et al. | 455/574 |
| 2005/0190710 | A1 * | 9/2005 | Chandra et al. | 370/311 |
| 2008/0043656 | A1 * | 2/2008 | Yoon et al. | 370/311 |
| 2008/0075026 | A1 * | 3/2008 | Son et al. | 370/311 |
| 2008/0261663 | A1 * | 10/2008 | Park et al. | 370/311 |
| 2008/0298292 | A1 * | 12/2008 | Jang | 370/311 |
| 2009/0141662 | A1 * | 6/2009 | Gurney et al. | 370/311 |
| 2010/0002612 | A1 * | 1/2010 | Hsu et al. | 370/311 |
| 2010/0128645 | A1 * | 5/2010 | Lin et al. | 370/311 |
| 2010/0278100 | A1 * | 11/2010 | West et al. | 370/328 |
| 2011/0002253 | A1 * | 1/2011 | Cha et al. | 370/311 |
| 2011/0022504 | A1 * | 1/2011 | Breau et al. | 705/34 |

* cited by examiner

*Primary Examiner* — Ian N Moore
*Assistant Examiner* — Jenee Alexander
(74) *Attorney, Agent, or Firm* — Schwegman, Lundberg & Woessner, P.A.

(57) ABSTRACT

Embodiments of power control in a wireless device include adjusting a snooze interval as a function of communication traffic characteristics. In some embodiments, the power control considers data rate, jitter, and throughput.

11 Claims, 6 Drawing Sheets

ADAPTIVE POWER CONTROL IN A WIRELESS DEVICE

TECHNICAL FIELD

Some embodiments pertain to wireless communications. Some embodiments pertain to power control in a wireless device.

BACKGROUND

Optimizing battery life of a wireless device enhances the user experience. Power control techniques are used in wireless devices to reduce power consumption and to extend the battery life.

DETAILED DESCRIPTION

The following description and drawings sufficiently illustrate specific embodiments to enable those skilled in the art to practice embodiments. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims. Embodiments may be referred to herein, individually or collectively, by the term "invention" merely for convenience and without intending to limit the scope of this application to any single invention or inventive concept if more than one is in fact disclosed.

A power saving method and architecture for wireless devices is presented that controls power by adaptively changing a snoozing interval based on traffic characteristics, Quality of Service (QoS) information and traffic mode detection.

Methods and arrangements for wireless communications are contemplated. Embodiments include transformations, code, state machines or other logic to adaptively change a snoozing interval of a wireless device. The embodiments may also include determining and examining network traffic of the station, and determining a "snoozing interval," wherein the length of the snoozing interval may be based upon the examination of the network traffic. The embodiments include determining a traffic mode and setting the snoozing interval in response to traffic characteristics and parameters. Embodiments further include adjusting and fine tuning the snoozing interval based on operational mode. While specific embodiments will be described below with reference to particular circuit or logic configurations, those of skill in the art will realize that embodiments of the present invention may advantageously be implemented with other substantially equivalent configurations.

A Communication System

Figure 1:
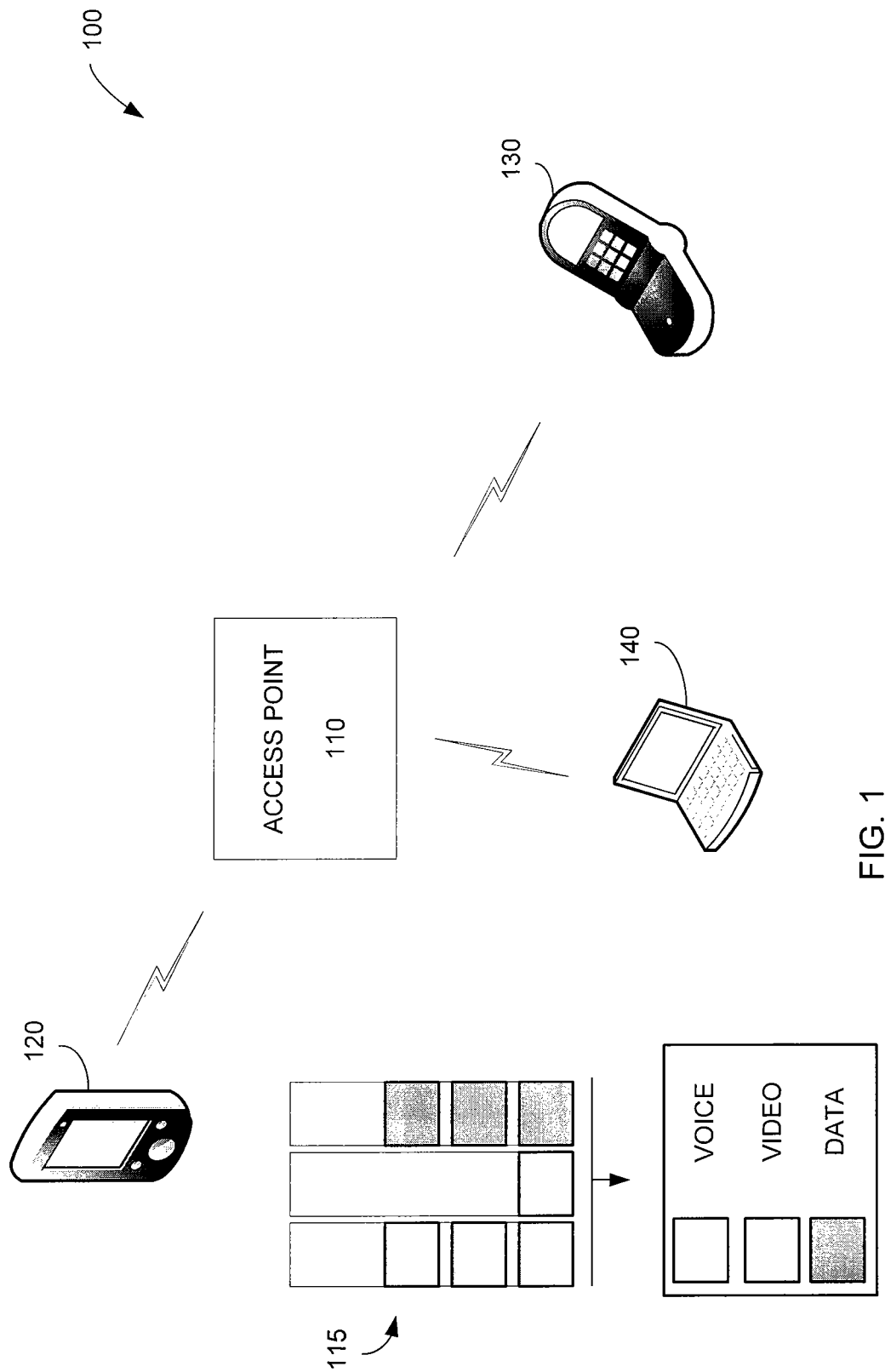
FIG. 1 illustrates a wireless communication network, in accordance with example embodiments.

FIG. 1 is a diagram of an embodiment of a wireless network 100. The wireless network 100 includes access point 110 and wireless devices or stations Personal Digital Assistant (PDA) 120, mobile phone 130, and laptop 140. The access point 110 and wireless devices (120, 130, and 140) may transmit and receive messages by means of radio frequencies (RF). An RF transmitter may impress digital data onto an RF frequency for transmission of the data by electromagnetic radiation. The RF transmitter may, for instance, modulate a carrier wave. An RF receiver may receive electromagnetic energy at an RF frequency and extract the digital data. The RF receiver may, for example, demodulate the received radio waves. Messages sent across network 100 may be referred to as network traffic.

Messages may be broken into several smaller units called packets, which may be sent across the network 100 and reassembled upon reception. Access point 110 may communicate with each of the wireless devices 120, 130, and 140 and may relay messages from one of packets to another. In some embodiments, access point 110 may comprise an access point for a wireless local area network (WLAN), operating according to the standards of IEEE 802.11. See the IEEE 802.11a standard, IEEE std. 802.11a-1999, published Feb. 11, 2000; the IEEE 802.11b standard, IEEE std. 802.11b-1999, published Feb. 11, 2000; the IEEE 802.11g standard, IEEE std. 802.11g-2003, published Oct. 20, 2003; and the IEEE 802.11 In standard, IEEE std. 802.11n, published in draft form Feb. 7, 2007. Access point 110 includes queue 115. Queue 115 stores packets for transmission to the wireless devices (120, 130, and 140), separating the voice, video, and data packets.

The wireless devices, or stations, (120, 130, and 140) may support modes of reduced power consumption (power-saving modes), during which they are not transmitting or receiving messages. The wireless devices may enter into power-saving mode for a period of time (snoozing or sleep interval), awaken, and poll access point 110 for messages. The wireless devices of FIG. 1 may be battery operated. The ability of switching to power-saving mode (sleeping) may significantly increase battery life.

Network 100 may provide a Quality of Service (QoS) capability. It may assign Access Categories (AC) to various streams of packets and may give different degrees of priority to the categories. An AC may include a common set of Enhanced Distributed Channel Access (EDCA) parameters that may be used by a QoS function to contend for a channel in order to transmit packets with certain properties. In many embodiments, the hierarchy of AC's may include, in ascending order of priority, a low-delay conversational class for voice traffic, a constant delay streaming class for streaming video, a payload-preserving interactive class for web browsing, and a best-effort background class for e-mails and downloads.

In many current networks, power-savings modes may interfere with QoS. In many network architectures, the networks may not know when the next packets may arrive. Conventional implementations of power saving schemes in these networks may be coarse grained. The snooze intervals may be multiples of a beacon interval. These snoozing intervals may be longer than the permissible delay for some classes of packets. For instance, VoIP packets may be received every 20 ms to 30 ms.

In network 100, the wireless devices (120, 130, and 140) may adaptively change their snoozing intervals based upon an examination of network traffic, thereby maintaining battery life while preserving QoS service. The changes may be based upon the classes of messages waiting in queue 115, the number of messages, the number of packets in a period of time, the inter-packet arrival time, or other measures of network traffic. The period of time may include a snoozing interval.

The wireless network 100 illustrated in FIG. 1 is for explanation, not for limitation. Systems for wireless communications useful according to various embodiments may include additional wireless devices or may omit some of the wireless devices shown. Wireless devices included in a wireless network may include smart phones, pagers, e-mail appliances, special-purpose units for scanning, bar coding, and credit card reading, and other devices that may be known to those of skill in the art.

Other embodiments may communicate according to a variety of wireless protocols including NFC (Near Field Communications), WLAN (Wireless Local Area Network), WMAN (Wireless Metropolitan Area Network), WiMAX (Worldwide Interoperability for Microwave Access), 3.5-3G cellular, RAN (Radio Access Network), PAN (personal area network), 4G, RFID (Radio Frequency Identification), and other wireless protocols which may be known to those of skill in the art. IEEE standards 802.11a, 802.11b, 802.11g, or 802.11n may apply to WLAN networks. IEEE standard 802.16 may apply to WiMAX networks. Standard ECMA-368 may apply to PAN networks.

A variety of network architectures may be used in other embodiments. In many embodiments, access point 110 may be connected to a wire line network such as the Internet and may act as a bridge between the wireline network and the wireless devices. Wireless devices such as wireless device 140 may communicate over the wireline network by communicating with access point 110. Access point 110 may then relay the communications over the wireline network. In many embodiments, access point 110 may relay communications to other access points and receive communications from other access points. This relay of communications may enable mobile stations associated with the access point to communicate with mobile stations associated with the other access points. In a number of embodiments, a network system may include multiple access points and controllers which control their operations. The multiple access points may handle the physical reception and transmission, and the controllers may handle much of the administrative processing of the network system. In some other embodiments, base stations as defined in IEEE 802.16 and wireless devices other than access points may communicate with multiple end stations and may relay communications from one end station to another.

In many other embodiments, an access point or other device for relaying communications to end stations may maintain queues which are not segregated by class of service. All messages for an end station, of whatever nature, may be contained in a single queue for the end station.

A Wireless Device

A communication system is made up of multiple nodes or points for implementing communication paths among multiple devices. A variety of configurations of such a communication system may include many different types of connections. Each device within a communication network may be considered a node or point of the network. A communication system may also include a common node providing connectivity and enabling communication paths to multiple devices; this type of common node is referred to as an Access Point (AP). As used herein, an AP refers to a device that provides connectivity for at least one other device. The AP provides connectivity within a communication system, which may include a network of connectivity, such as communication through the Internet or other networked environment. In one example, an AP provides connectivity to a network for a group of devices. The network may support one or multiple communication protocols. For example, the network may support Wi-Fi connectivity to Wi-Fi stations as specified in by IEEE 802.11, which is a set of standards for implementing communications in WLAN. A network or system may support other communication protocols as well.

In a communication system, the multiple devices may offer different services or capabilities. Similarly, a group of devices may offer a composite service, such as where the group includes a server for coordinating operations and individual computing devices. As used herein, "device" and "computing device" are not meant to refer strictly to a stand-alone machine, but may refer to modules, circuitry, software, hardware, firmware, or other machines within one device. For communication within a communication system or network, a device desiring to use a service requires a way to access the service. In one example, a device may request information about the capabilities available in the system or from a specific device, or may receive information as broadcast from within the system.

In many other embodiments, an access point or other device for relaying communications to end stations may maintain queues which are not segregated by class of service. All messages for an end station, of whatever nature, may be contained in a single queue for the end station.

An operational consideration of wireless devices is to minimize the power consumption of the device, such as by turning off modules within the device. In one example, power control identifies those times when the wireless processing is not used. This is done by monitoring the operating conditions in order to turn the device off whenever the wireless portion is not needed. For a WLAN device, there is a need to wake up the device. When the device is turned off or in a low power mode, the device may not know when to wake up and, similarly, how long to remain in a sleep mode. In some embodiments, the power consumption of a wireless device is minimized by adaptively controlling the snoozing, or sleeping, interval based on the traffic characteristics of communications, QOS information and operational modes.

In some embodiments, a power management framework for the communication device includes mode detection to detect the operating mode and snooze interval adjustment. The operating mode detection is based on the traffic characteristics, or information associated with external modules in a wireless communication system. Further, the operating mode information may be received from an Application Programming Interface (API). Adjustment of the snooze interval effectively tunes the snoozing interval according to an update process, wherein different update processes are used for each of various operating modes.

Such a power management framework may be part of a power management system architecture for the wireless communication device, wherein decisions are made based on an output of a mode detection module. The decisions may bring the wireless communication device out of power saving mode. Depending on the detected mode, the wireless communication device may be placed in one of various power managed states, each having separately calculated snoozing intervals.

Figure 2:
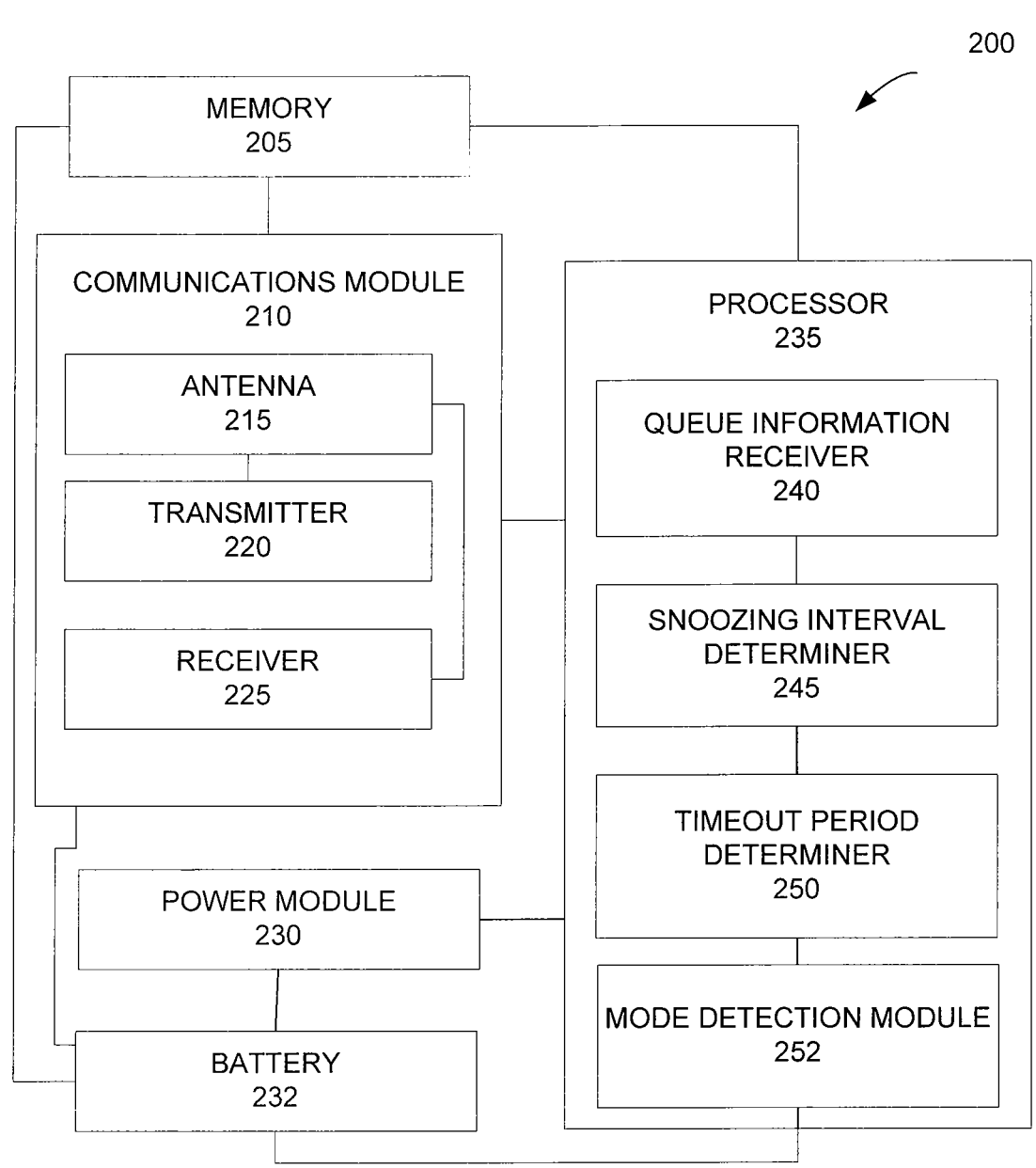
FIG. 2 illustrates a wireless device, in accordance with example embodiments.

Turning to FIG. 2, shown is a diagram of an embodiment of an apparatus to adaptively change a snoozing interval. Station 200 includes memory 205, a communications module 210, a power module 230, a battery 232, and a processor 235. Memory 205 may include Random Access Memory (RAM) and non-volatile memory such as a hard disk drive, optical disk drive, electrically erasable programmable read-only memory space (Electrically Erasable Programmable ROM (EEPROM) or Flash memory) drives, or as any other kind of computer memory as will occur to those of skill in the art.

Communications module 210 includes antenna 215, transmitter 220, and receiver 225. Transmitter 220 may modulate information onto a carrier signal, amplify the signal, and broadcast the signal over the channel. Transmitter 220 may send messages to an access point or other intermediate node to check for messages queued for station 200 (poll the access point). Receiver 225 may take in the transmitted signal from the channel and process it to retrieve the information signal. Receiver 225 may attempt to discriminate the signal from other signals which may use the same channel, amplify the signal for processing, and demodulate or remove the carrier from the processed signal to retrieve the information that was sent. Transmitter 220 and receiver 225 may operate in power-saving mode. They may be turned off for short periods of time to conserve the power of battery 232. Communications module 210 may include an Intel wireless network adapter card such as the Intel® PRO/Wireless 3945ABG Network Connection or the Intel® PRO/Wireless 2915ABG Network Connection, which support protocols 802.11a, b, and g; or the Intel® PRO/Wireless 2200BG Network Connection, which supports protocols 802.11 band g.

Power module 230 may be able to switch station 200 into a power-savings mode and return from it according to a time schedule, such as after a predetermined interval. In the future, power-savings cycles of even smaller times may be possible. Station 200 may be able to provide QoS while conserving battery life by entering a power-savings mode for many short periods.

Processor 235 includes queue information receiver 240, snoozing interval determiner 245, and timeout period determiner 250. Queue information receiver 240 may receive information about the messages queued for station 200 in an access point such as access point 110 in FIG. 1. The information may consist of the numbers and classes of messages, the total number of messages, or simply whether the message queue is empty. Transmitter 220 may obtain information about the messages on queue by polling an access point.

Snoozing interval determiner 245 may determine the length of a snoozing interval for communications module 210. Snoozing interval determiner 245 may base the snoozing interval upon the information about network traffic for station 200 contained in queue information receiver 240.

Timeout period determiner 250 may determine the length of a timeout period for communications module 210. A timeout period is a period of inactivity after which a snoozing interval may be re-determined. Timeout period determiner 250 may base the timeout period upon the information about network traffic for station 200 contained in queue information receiver 240.

The processor 235 further includes a mode detection module 252 which identifies the operating mode of communications by evaluating the traffic parameters and comparison to threshold values. The mode detection module 252 identifies the operating mode and provides this information to the snoozing interval determiner 245, which applies the corresponding snooze interval and snooze interval adjustment processing.

The station 200 illustrated in FIG. 2 is for explanation, not for limitation. Some embodiments may include a filter that smoothes the number of received packets so that the calculated snoozing interval does not change due to impulsive changes in the number of received packets.

The embodiments disclosed avoid problems associated with traditional techniques, where a wireless device provides a sleep state on expiration of a timeout period. The use of a timeout period introduces a conflict between reducing the timeout period to increase performance while decreasing the timeout to gain energy efficiency. Additionally, for wireless communication devices the optimum way of minimizing power consumption is to place the wireless device in a power saving mode, such as when the device is not communicating. However, this state transition takes time and incurs overhead. Without knowledge of how long the device will be idle, a device impacts the network performance on each power down of the wireless module.

The embodiments presented herein provide an adaptive solution, wherein the snooze interval and power reduction techniques are based on operational characteristics of the communication traffic.

Figure 3:
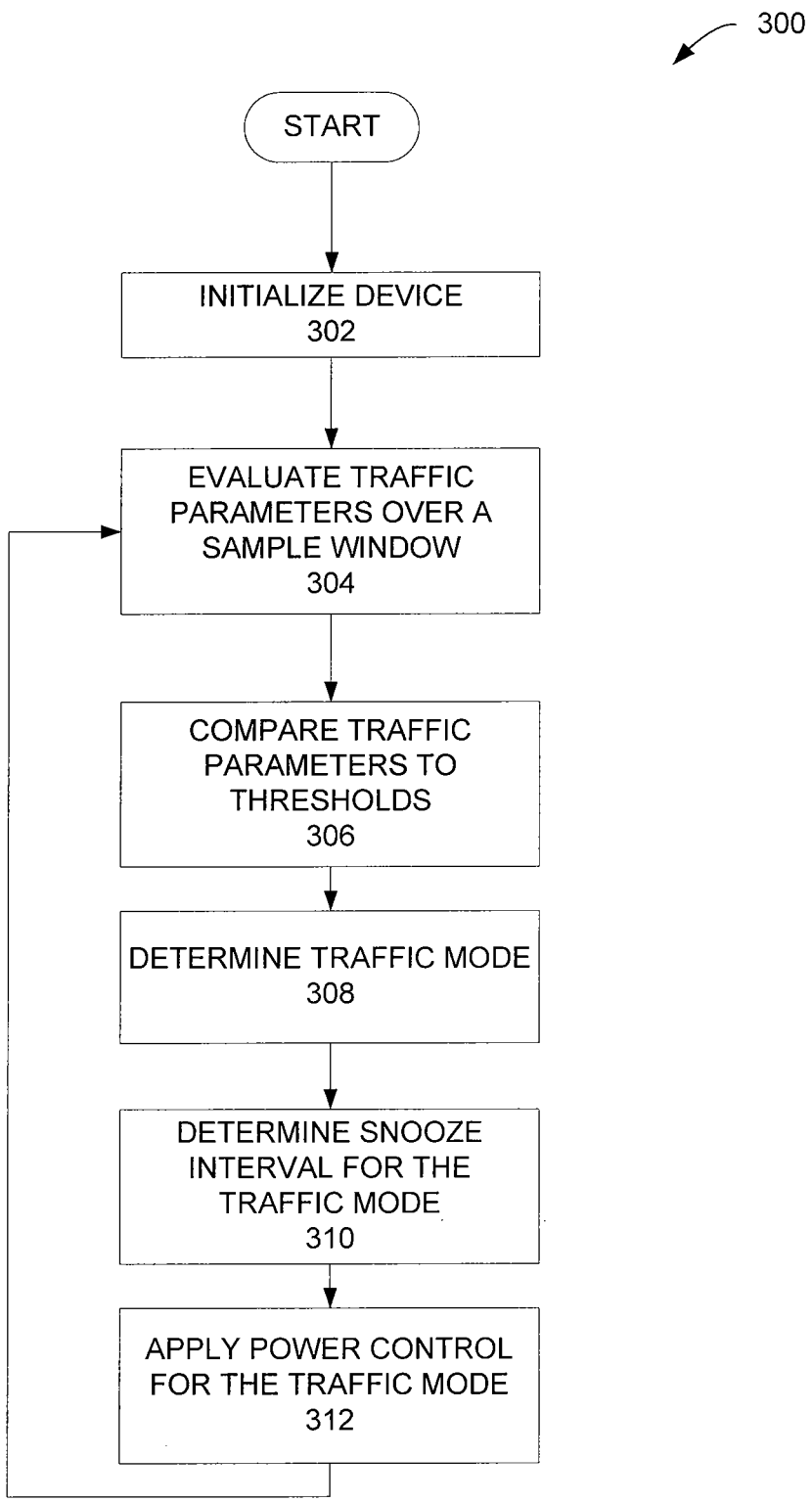
FIG. 3 is a flow diagram illustrating methods for adaptively controlling a snooze interval, in accordance with example embodiments.

FIG. 3 illustrates a method for determining and controlling a snoozing interval. The process 300 starts by initializing 302 the device for wireless communications. As communications proceed, the process 300 then evaluates 304 the communications to identify traffic parameters over a sample window. The traffic parameters are compared 306 to threshold values. The comparison 306 determines a type of traffic or a mode of the communication. The process 300 determines 308 the traffic mode and determines 310 a snooze interval for the traffic mode. Finally, power control is applied 312 to the device based on the traffic mode. Some embodiments allow a Wireless Network Interface Card (WNIC) to conserve power by sleeping in the time between packet bursts, wherein the snooze interval and timing is based on the traffic and not a timeout based scheme.

Some embodiments of power control to classify ongoing communications and detect the mode of operation may be implemented in a wireless device, such as a NIC device, without a specific eco-system or application-level support structure. In some embodiments, the power control techniques, such as method 300, are applicable without modification of hardware in a device, such as by provision as software updates. In one example, the power control method enables a network-connected platform to receive information from a device to identify upcoming idle time duration. This information enables energy efficient operation of the network-connected platform and allows optimization of platform transitions, allowing quicker decisions resulting in additional power savings.

Some embodiments decouple power control from higher layer applications as the QoS requirements are derived by observing traffic characteristics and not received as inputs from applications. The power reduction is therefore applicable to multiple applications, as power reduction does not rely on the applications. In some embodiments, application information is used to determine the snoozing interval and make snoozing operational decisions, such as when to enter snooze mode and when to exit snooze mode. The OS may further provide information regarding current running applications which may impact power control, such as adjustment of parameters controlling the snooze mode.

Power control is implemented by monitoring network traffic. In one example, the method tracks packets by counting the packets received at the device. The information may be used to predict the duration of a next Snoozing Interval (SI). In periods of no network activity, the SI progressively increases. When a packet is received at the device, an appropriate SI for a next idle period is determined. These adaptive snoozing techniques may be implemented in the receiver module of a NIC and acts to update the traffic statistics during a Service Period (SP). The process continues to calculate the SI at the end of an SP, and in this way, the process is adaptive to a variety of operating conditions.

The information considered in determining an operating mode includes information regarding network traffic characteristics. This information is used to identify an operating mode. The operating system may further provide information regarding the running application(s). This is then used to control the SI value to provide higher energy gain and enhance performance.

In some embodiments, the power control method has two main components: 1) mode detection to determine the operating mode and the equivalent QoS requirements; and 2) SI update algorithms based on the detected mode of operation. The operational mode detection at the device level will categorize network traffic and evaluate the traffic against the QoS requirements associated therewith, and allows such without evaluating the contents of the packet in methods such as deep packet inspection. The device may also make use of the network traffic information provided by the operating system in evaluating the traffic for running applications and the associated QoS. In an example, the information is provided such as when an out-of-band channel between the operating system and a device driver is available.

In the operational mode detection module in one embodiment the device continuously samples the traffic and determines a mode of operation at the end of a sampling window. In some embodiments, modes of operation may include a default mode referred to as "best-effort," a Constant Bit Rate (CBR) mode which may be used for communications such as Voice over IP (VoIP), a high throughput mode for communications such as File Transfer Protocols (FTPs), and an idle mode referred to as Long-Term Idleness (LTI) mode.

The wireless device will continuously loop between active and snoozing states. During the active state, the wireless device sends a packet to an AP; the packet triggers the AP to deliver any packets which are directed to the wireless device. The wireless device receives the packets and samples the traffic as part of the operational mode detection. The snoozing interval is determined based on the detected mode of operation. The wireless device transitions to the snoozing state for the snoozing interval.

Figure 4:
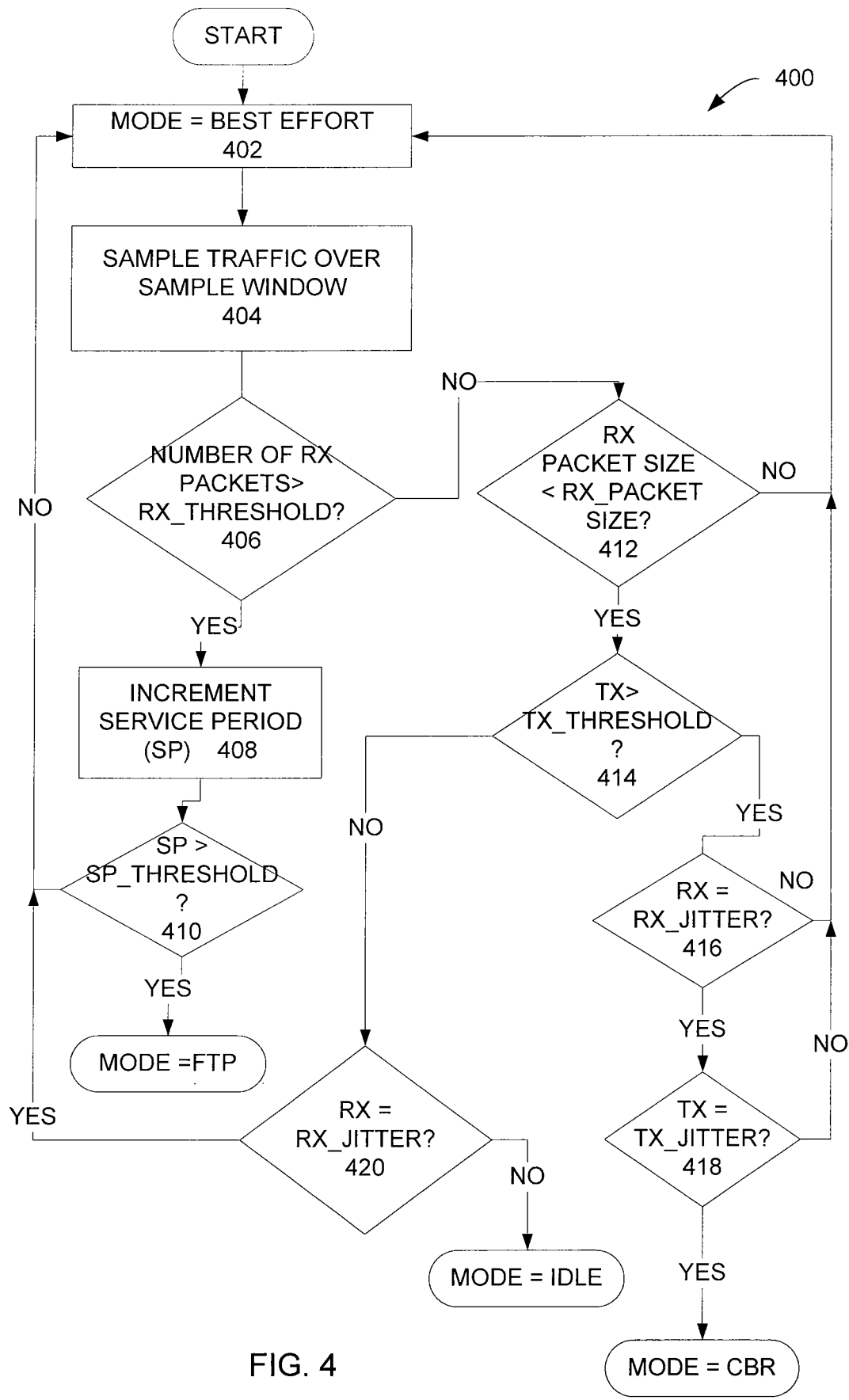
FIG. 4 is a flow diagram illustrating a method for determining an operational mode, in accordance with example embodiments.

FIG. 4 illustrates a flow chart detailing operational mode detection method 400 according to an example embodiment. The method 400 samples and gathers historical statistics of ongoing network traffic to detect a mode of operation at the end of each sampling window. The categories for the mode of operations of method 400 include the four given above, however, alternate embodiments may implement any number of modes of operation and may use different criteria to distinguish operational modes.

In the method 400, a best-effort mode is used as a default mode of operation in the example embodiment of FIG. 4, wherein, at initialization a wireless device initializes the snoozing interval to this mode. The device then continues to determine a mode of operation and, may change to another mode as the type of communications changes, may change to another mode. The method 400 may return to the default mode when communications do not fall clearly into another category.

The method 400 further identifies a high data rate type of traffic and applies the high throughput mode for control of the snoozing interval. This is the case, when a sustained large number of packets are successively received at the wireless device, such as a Network Interface Card (NIC) device.

Additionally, the method 400 identifies a CBR type of traffic, such as for a streamed video or VoIP communication, and applies the CBR mode for control of the snoozing interval. A CBR type traffic is detected when a constant bit rate traffic is identified at the wireless device. The mode detection compensates for jitter in the received communications. When the wireless device receives a 2-way communication in which the transmission data rate is close to that of a data rate of the received packets, the method 400 detects a two-way CBR type traffic and applies the two-way CBR mode for control of the snoozing interval.

The method 400 then detects a long-term idle type traffic when the majority of received packets at the wireless device are below a predetermined packet size. The received packets are from the receive path and may include broadcast packets sent to multiple receivers. In one example the predetermined packet size is a function of the Maximum Transmission Unit (MTU) of a communication layer of a communications protocol, which is the size in bytes or other measurement unit of a largest protocol data unit that the communication layer may pass to another layer.

In addition, the decision of the operational mode detection may be enhanced by use of information received from a source external to the wireless device, such as a sensor, another wireless device or radio. Also, the operational mode detection may incorporate other operational information related to application parameters, Operating System (OS) power management, and by way of information received via APIs. In one example, the wireless device is a mobile device, which scans to identify an AP, and when the mobile device remains stationary scanning is disabled after location and connection of an AP.

Continuing with FIG. 4, the method 400 starts by setting 402 the initial state of the operational mode to a default setting of best-effort mode. The method 400 involves activities to sample 404 the traffic involving the wireless device over a sample window. When a number of received packets is greater than a receive threshold value for the sample window as determined 406 by the process, processing continues to increment 408 a Service Period (SP). The sample period identifies when multiple sample windows receive a number of packets greater than a receive threshold value. When the SP value is above an SP threshold 410, the mode is detected as a high throughput mode. When the SP value is not above the SP threshold 410, processing returns to setting 402 the operation mode to the default. In some embodiments, after each change in the detected mode, the SP value is reset. When the number of received packets is not greater than a threshold value 408, processing continues to determine 412 if the received packet size is less than a threshold value, and if so determines 414 if the transmission data rate is greater than a transmission threshold. When the transmission data rate exceeds the threshold rate, the method 400 further checks to ensure the packets are arriving at a fixed rate, and if not the operational mode is set to best effort mode. If packets are arriving at a fixed rate at this point, the operational mode is set to an idle mode, or LTI mode.

Returning to decision 412, if the received packet size is not less than the threshold value processing returns to setting 402 the operational mode to best effort. Returning to decision 414, if the transmission data rate is not greater than the transmission threshold processing continues to evaluating 416 the received packets against a received jitter value. If so, processing continues to evaluating the transmission against a transmit jitter value. If the received packets satisfy the received jitter value and the transmission satisfies the transmit jitter value, the operation mode is set to CBR. Else, processing returns to set the operational mode to the default setting. In other words, the decision point 416 determines receive intervals or time between bursts. When the receive intervals are approximately equal, there is little jitter. Similarly, at decision point 418 jitter is determined for transmitted packets on the transmission path, considering inter-burst times for transmissions. The method 400 involves activities to determine if such inter-burst times are consistent and responds accordingly. The jitter criteria may be determined by the QoS requirements for a given transmission. When the jitter is not within an acceptable region, the wireless device remains in best effort mode.

When the transmission data rate is greater than the transmission threshold processing continues the evaluate 416 the received packets to a received jitter value, and if the received packets are equal to the expected jitter value, the operational mode is set to idle. If the received packets do not satisfy the received jitter value, the operation mode remains in default or best effort mode.

Figure 5:
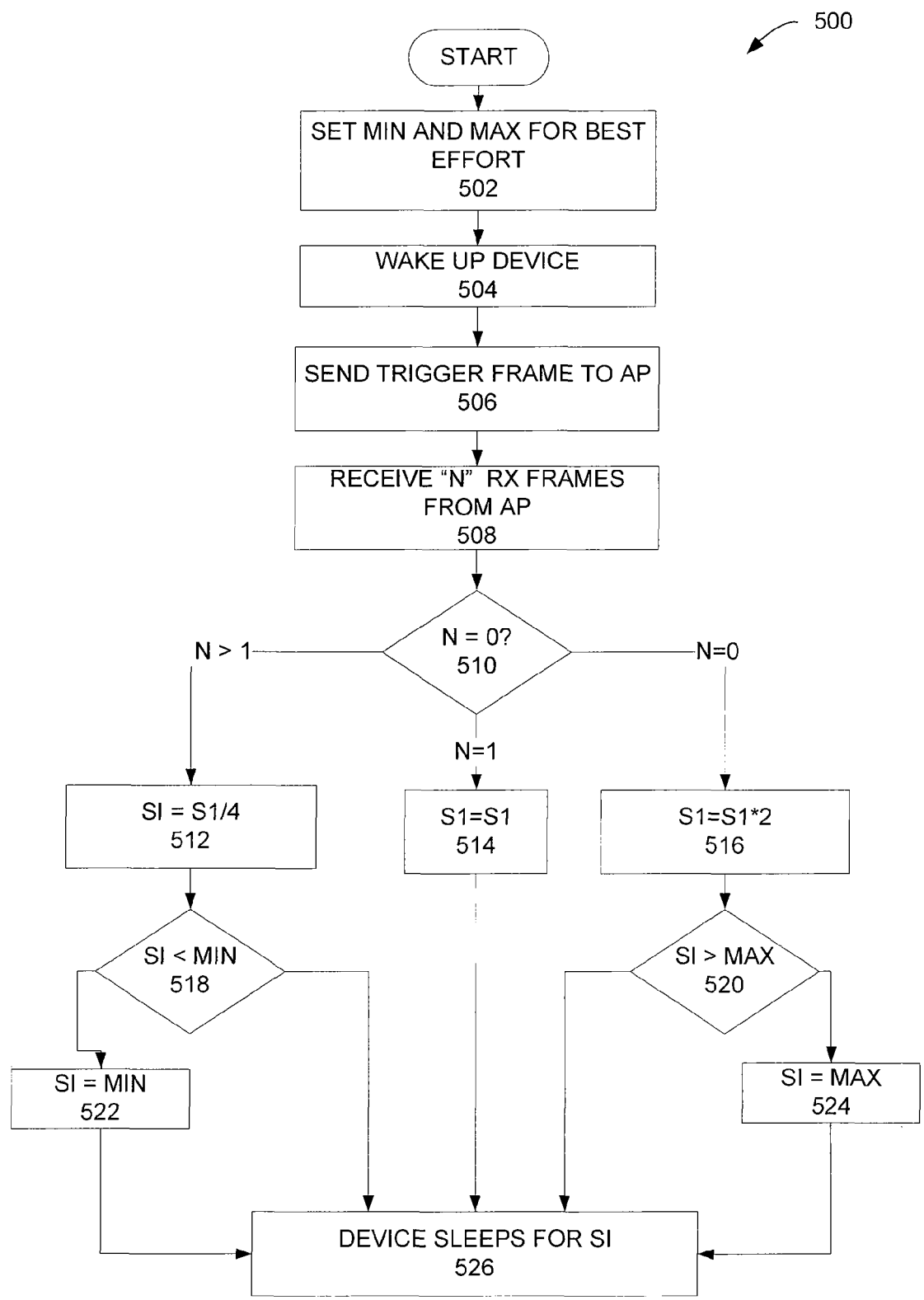
FIGS. 5 and 6 are flow diagrams illustrating methods for control of a snooze interval, in accordance with example embodiments.

Once operational mode is determined, the wireless device then applies a control mechanism corresponding to the detected operational mode. In a first example, best effort or default mode processing is illustrated in FIG. 5. The method 500 may be considered the default control method, which is triggered when the mode detection indicates a best mode or when the mode information does not clearly fall into one of the other categories, such as where the operational mode is not deduced from the traffic characteristics or OS inputs. Traffic falling into the best effort mode is considered to be insensitive to QoS metrics, jitter, packet loss or latency. Examples of best effort mode traffic include email and web-browsing applications. In the best effort mode the wireless device may tolerate a longer snoozing interval.

As illustrated in FIG. 5, the method 500 sets 502 a minimum snoozing interval and a maximum snoozing interval corresponding to the best effort mode. The wireless device wakes up 504, or enters an active state, and sends 506 a trigger frame to the AP. The wireless device then receives 508 a number of frames, N, from the AP. Some embodiments determine a number of packets of data received. The decision step 510 then determines the value of N, and adjusts the snoozing interval accordingly. When no frames are received, the snoozing interval is increased 516, such as to double the snoozing interval. The adjusted value of the snoozing interval is maintained at or below the maximum value 520, 524.

When N equals 1, the snoozing interval is maintained 514. When N is greater than 1, the snoozing inverval is adjusted, such as to decrease 512 by a predetermined amount. The adjusted value of the snoozing interval is maintained at or above the minimum value 518, 522. The wireless device then enters the snooze mode 526 for the adjusted snoozing interval.

Some embodiments apply an exponential aggressive update method to accelerate the convergence to a final snoozing interval value to enhance energy savings.

Figure 6:
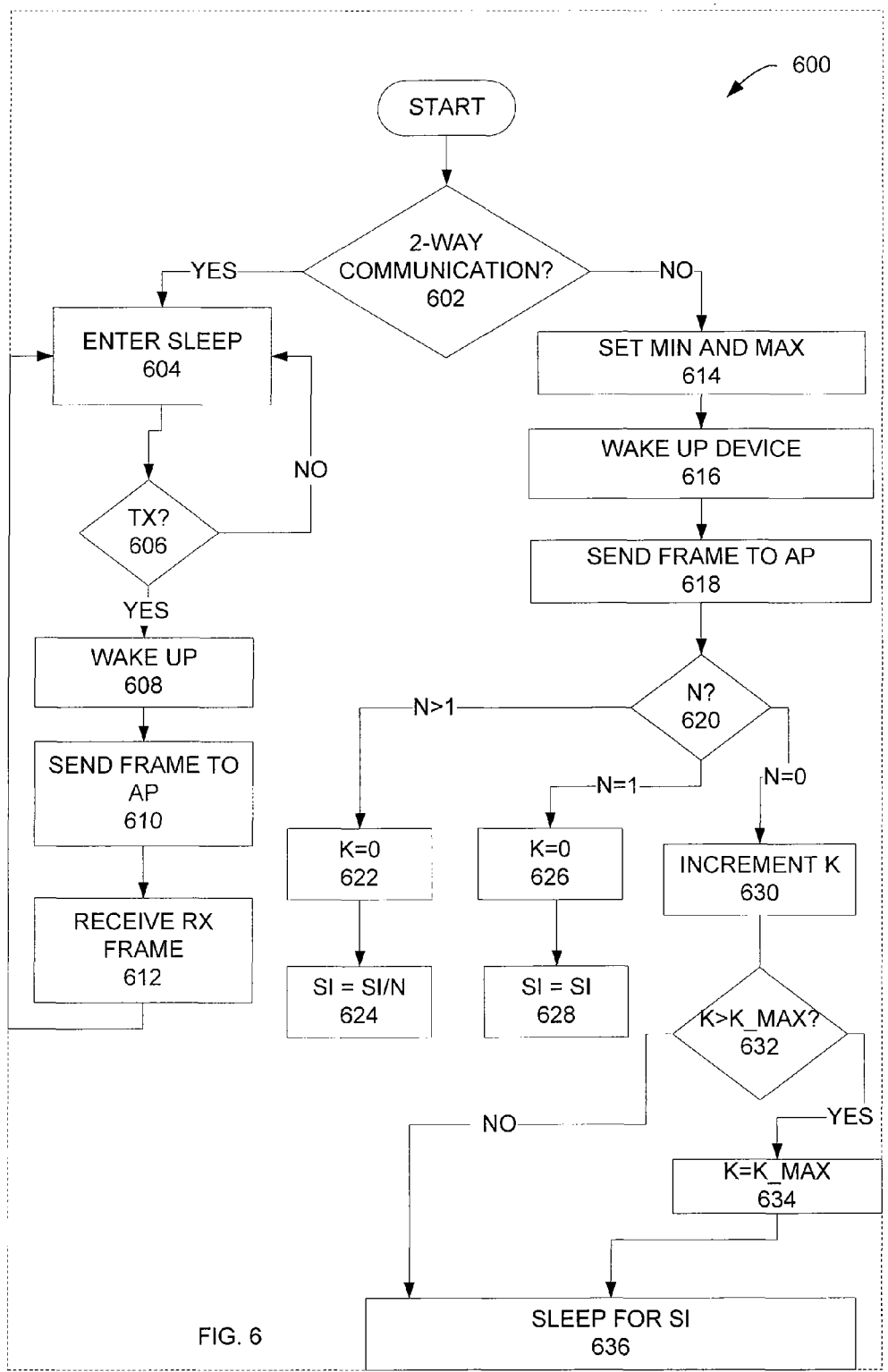

FIG. 6 illustrates a method 600 for processing CBR mode traffic. The CBR is not as insensitive to operational characteristics as is the best effort mode traffic, but is sensitive to QoS metrics. The CBR further has an inherent reliance on time synchronization between a traffic source and destination, and therefore the method 600 provides a predictable response time. Further, for CBR mode traffic latency is to be minimized in the network. Examples of CBR mode traffic include video conferencing, VoIP and live video streaming. FIG. 6 illustrates a method for updating the snoozing interval for CBR mode traffic.

As illustrated in FIG. 6, the method 600 separates actions depending on the type of detected CBR communication. A decision 602 determines if the communication is a two-way communication, and if so, processes the communication accordingly. When the communication is two-way CBR traffic, the wireless device enters sleep mode 604 to wait for a transmission event. On occurrence of a transmission event 606, the wireless device wakes up 608 and enters an active state. The wireless device then sends 610 packet data, including a trigger packet to the AP. In response, the AP will deliver any incoming packets, such as those directed to the wireless device, wherein the packets are buffered in the AP. In this case, the transmission and received packets are aligned and the wireless device wakes up once to handle both packets so as to maximize the snoozing time. In two-way communication, when a transmission is not synchronized with the receive path, the device will wake up to handle transmissions and then some time later wake up to handle received packets. In some embodiments, receive packets may be received 612. In some embodiments, the transmission path and receive path are synchronized. In this way, the wireless device knows when to expect an incoming packet and is able to request the AP to receive packets accordingly. The wireless device may then receive packets, and coordinate this with times when the wireless device has data to transmit. Hence when the wireless device is transmitting, the wireless device may also receive at the same time thereby reducing the sleeping time for the wireless device.

During processing of unidirectional communications, the process sets a minimum and maximum value, and wakes up 616 the wireless device. The process then sends 618 frames to the AP. The number of frames, N, is evaluated at decision point 620. When no packets are sent, processing increments 630 a variable K 630, and maintains K below a maximum value, 632, 634. The device then sleeps or snoozes for a period SI. When N is greater than 1, the snoozing interval is reduced 622, such as to divide 624 by the number N. When N is equal to 1 (626), then the snoozing interval is maintained 628.

High throughput traffic may be bursty traffic in which data is sent in packet bursts followed by silent periods. Such traffic is sensitive to QoS metrics and particularly sensitive to latency. Therefore, when operational mode detection identifies the communications as high throughput traffic, such as FTP, is detected, the wireless device is set to the active mode until the traffic mode changes. This prevents degradation of the communications.

When a wireless device is not engaged in any active communications, the device continues to receive background noise which acts as traffic. These noise packets are mostly network management packets, such as Address Resolution Protocol (ARP), Network Basic Input/Output System (NetBIOS), Internet Control Message Protocol (ICMP), as well as other techniques to manage traffic protocols in the background, and so forth. Depending on the network the wireless device may be receiving these management packets at a rate high enough to prevent the system from going into snoozing mode, or platform-level low power state. The snooze interval update for idle mode traffic is similar to the update during default mode. This may apply an exponential increase and or decrease to the snoozing interval. The boundaries for each snoozing interval, such as the minimum snoozing interval and the maximum snoozing interval, may be thus adjusted. The values may be set to provide a larger or smaller snooze interval. In one example, the maximum value can be set to multiple Delivery Traffic Indication Message (DTIM) values which will allow the wireless device to enter snooze state across DTIMs and save more energy. The DTIM information and protocol are defined in IEEE 802.11 specifications. Typically, DTIM values may be in the range of multiples of 100 msec (e.g. 200 msec), but other values could be implemented depending on the system components, system configuration, application, type of traffic, QoS of traffic or application, OS, and so forth.

In one embodiment, an apparatus includes a communication module or transceiver to send and receive wireless communication signals within a wireless communication network, and further includes a proxy processing module to provide access point services within the wireless communication network and to receive service provider information from a plurality of service providers associated with the apparatus. Further the apparatus includes a memory storage unit to store the service provider information for the plurality of service providers, wherein the communication module is to transmit an indication of the service provider information to at least one service consumer in the wireless communication network. The apparatus may support a wireless communication protocol for Wi-Fi communications. The proxy processing module may transmit a proxy advertisement within the wireless communication network. The service provider information is received as an information element including a service provider identifier, a service type identifier, and access information for the service provider. Further, the proxy processing module transmits service provider information for a plurality of service providers within the wireless communication network. The proxy processing module is further to retrieve service provider information in response to a service request from a service consumer in the wireless communication network.

In some embodiments, a machine-readable medium is comprised of instructions, which when implemented by one or more machines, cause the one or more machines to receive a registration request from a service provider, store a set of information for the service provider in a memory storage unit, and transmit an indication of the service provider to at least one service consumer in the wireless communication network.

Unless specifically stated otherwise, terms such as "processing," "computing," "calculating," "determining," "displaying," or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware, and software. Embodiments may also be implemented as instructions stored on a machine-readable medium, which may be read and executed by at least one processor to perform the operations described herein. A machine-readable medium may include any mechanism for storing or transmitting information in a form readable by a machine (e.g., a computer). A machine-readable medium may include, but is not limited to, FLASH memory, optical disks, Compact Disks-Read Only Memory (CD-ROM), Digital Versatile/Video Disks (DVD), Read Only Memory (ROM), Random Access Memory (RAM), EPROM, Electrically Erasable Programmable Read-Only Memory (EEPROM), magnetic or optical cards, propagation media or other type of machine-readable media suitable for storing electronic instructions. For example, embodiments may be downloaded as a computer program, which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with at least one embodiment. Therefore, it should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

Similarly, it should be appreciated that in the foregoing description of embodiments, various features are sometimes grouped together in a single embodiment, figure, or description thereof for the purpose of streamlining the disclosure, aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Having disclosed embodiments and the best mode, modifications and variations may be made to the disclosed embodiments while remaining within the scope of the embodiments as defined by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for a wireless communication device, comprising:
   determining a mode of the communications based on traffic characteristics;
   setting a snooze interval based on the determined mode;
   placing the wireless communication device in a reduced power state for the snooze interval;
   after the expiration of the snooze interval, receiving, by the wireless communication device, zero or more data packets during a period, establishing a communication data rate for the period;
   adjusting the snooze interval as a function of the communication data rate;
   setting the snooze interval to zero for a high data rate mode of communications when a number of received data packets exceeds a first threshold value;
   setting the snooze interval to a constant bit rate value when a number of transmitted data packets exceeds a first threshold value;
   when communications are bi-directional communications, placing the device in the reduced power state until transmission of a data packet;
   when the communications are uni-directional communications, setting a maximum snooze interval value;
   processing further data communications; and
   adjusting the snooze interval based on a number of packets received in the further data communications by:

reducing the snooze interval when the number of packets received in the further data communications is greater than a second threshold value; and increasing the snooze interval when the number of packets received in the further data communications is equal to zero.

2. The method of claim 1, further comprising:

setting the snooze interval to a best effort value as a default value when a throughput for the communications is below a second threshold value;

processing further data communications; and adjusting the snooze interval based on the number of packets received in the further data communications.

3. The method of claim 2, wherein adjusting the snooze interval further comprises:

reducing the snooze interval when the number of packets received in the further data communications is greater than the second threshold value; and increasing the snooze interval when the number of packets received in the further data communications is equal to zero.

4. The method of claim 1, wherein the wireless communication device is a network interface controller configured to communicate in accordance with one of the IEEE 802.11n standards.

5. A non-transitory machine-readable medium comprising instructions, which when implemented by one or more machines, cause the one or more machines to:

process communications of packets of data;

determine a mode of the communications based on traffic characteristics;

set a snooze interval based on the determined mode;

place the wireless communication device in a reduced power state for the snooze interval;

after the expiration of the snooze interval, receive zero or more data packets during a period, establishing a communication data rate for the period;

adjust the snooze interval as a function of the communication data rate;

set the snooze interval to zero for a high data rate mode of communications when a number of received data packets exceeds a first threshold value;

set the snooze interval to a constant bit rate value when a number of transmitted data packets exceeds a first threshold value;

when communications are bi-directional communications, place the device in the reduced power state until transmission of a data packet;

when the communications are uni-directional communications, set a maximum snooze interval value;

process further data communications; and adjust the snooze interval based on a number of packets received in the further data communications by:

reducing the snooze interval when the number of packets received in the further data communications is greater than a second threshold value; and increasing the snooze interval when the number of packets received in the further data communications is equal to zero.

6. The non-transitory machine-readable medium of claim 5, further comprising instructions to:

set the snooze interval to a best effort value as a default value when a throughput for the communications is below a second threshold value;

processing further data communications; and adjust the snooze interval based on the number of packets received in the further data communications.

7. An apparatus, comprising:

a communication module to send and receive data packet communications in a wireless communication network;

a processor to set a snooze interval based on traffic characteristics of the communications; and a power module to place the apparatus in a low power mode for the snooze interval, wherein the communication module is further to, after the expiration of the snooze interval, receive zero or more data packets during a period, establishing a communication data rate for the period, wherein the processor is to:

adjust the snooze interval based on a communication data rate;

set the snooze interval to zero for a high data rate mode of communications when a number of received data packets exceeds a first threshold value;

set the snooze interval to a constant bit rate value when a number of transmitted data packets exceeds a first threshold value;

when communications are bi-directional communications, place the device in the reduced power state until transmission of a data packet;

when the communications are uni-directional communications, set a maximum snooze interval value; and adjust the snooze interval based on a number of packets received in further data communications by:

reducing the snooze interval when the number of packets received in the further data communications is greater than a second threshold value; and increasing the snooze interval when the number of packets received in the further data communications is equal to zero.

8. The apparatus of claim 7, wherein the processor is further to:

set the snooze interval to a best effort value as a default value when a throughput for the communications is below a second threshold value;

process further data communications; and adjust the snooze interval based on the number of packets received in the further data communications.

9. The apparatus of claim 8, wherein the processor is further to:

reduce the snooze interval when the number of packets received in the further data communications is greater than the second threshold value; and increase the snooze interval when the number of packets received in the further data communications is equal to zero.

10. The apparatus of claim 7, wherein the processor is to adjust the snooze interval such that the snooze interval does not exceed the maximum snooze interval value.

11. The apparatus of claim 7, wherein the apparatus is a wireless network interface controller.

* * * * *